(No Model.) 2 Sheets—Sheet 1.
R. O. CLARK.
CAR FENDER.
No. 543,849. Patented Aug. 6, 1895.
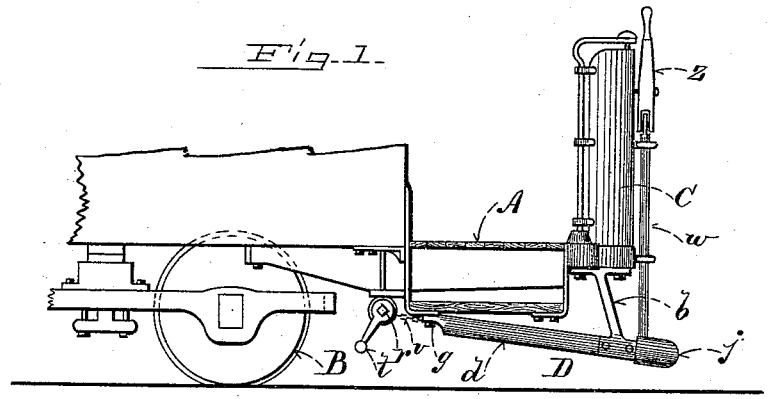
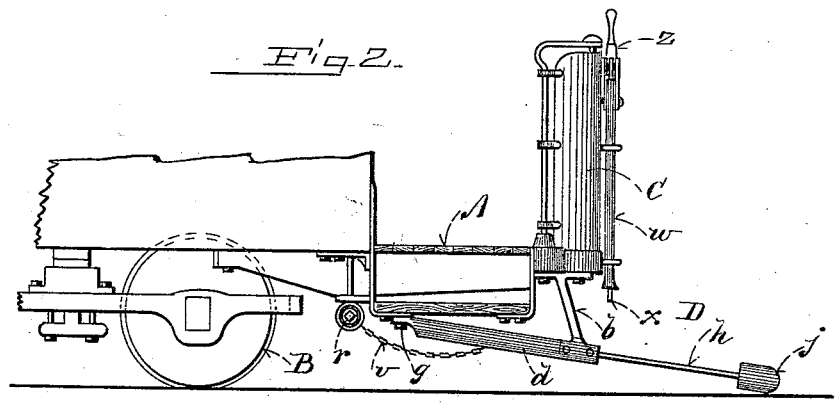
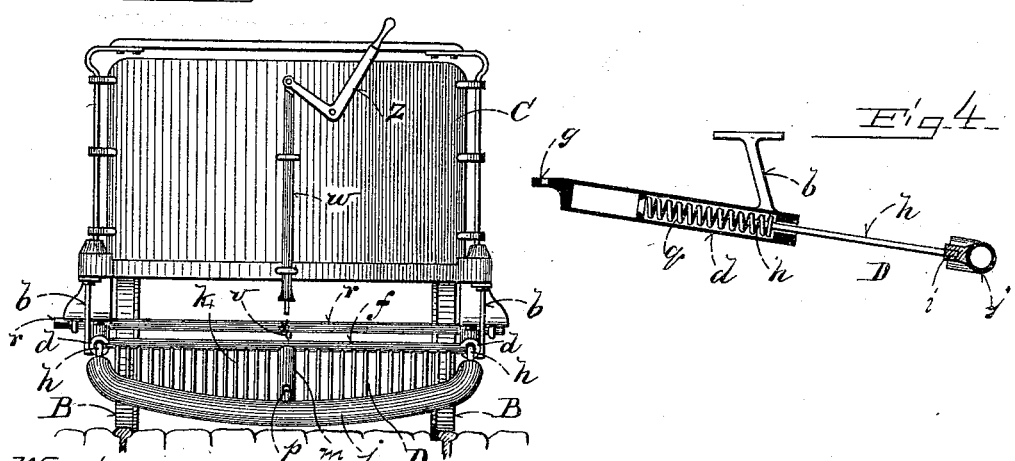
WITNESSES:
E. M. Carroll
Emily Sanborn
INVENTOR:
Rufus O. Clark,
By C. A. Shawhler,
Attys.

(No Model.) 2 Sheets—Sheet 2.

R. O. CLARK.
CAR FENDER.

No. 543,849. Patented Aug. 6, 1895.

WITNESSES:
E. N. Carroll
Emily Sanborn

INVENTOR
Rufus O. Clark,
By C. A. Shaw & Co.,
Attys.

ed in Fig. 3.) Within the slideways d coiled# UNITED STATES PATENT OFFICE.

RUFUS O. CLARK, OF MARLBOROUGH, MASSACHUSETTS.

CAR-FENDER.

SPECIFICATION forming part of Letters Patent No. 543,849, dated August 6, 1895.

Application filed April 15, 1893. Serial No. 470,478. (No model.)

*To all whom it may concern:*

Be it known that I, RUFUS O. CLARK, of Marlborough, in the county of Middlesex, State of Massachusetts, have invented certain new and useful Improvements in Car-Fenders, of which the following is a description sufficiently full, clear, and exact to enable any person skilled in the art or science to which said invention appertains to make and use the same, reference being had to the accompanying drawings, forming part of this specification, in which—

Figure 5:
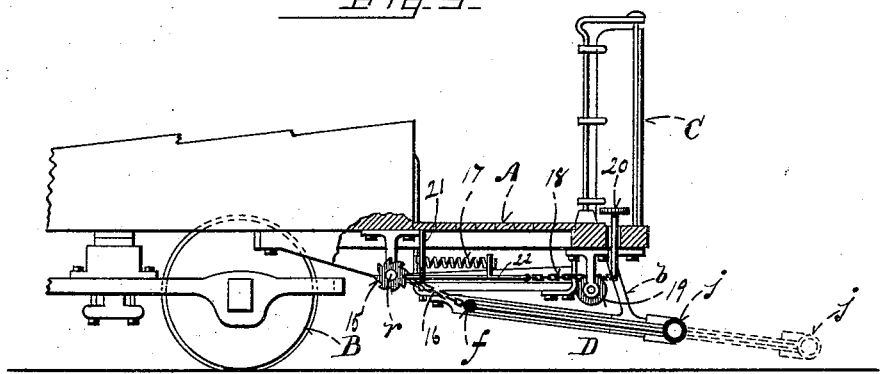

Figure 1 is a side elevation of a portion of a street-car, showing a portion of my improved fender housed or elevated; Fig. 2, a like view showing the fender projected; Fig. 3, a front elevation of the same; Fig. 4, a sectional view showing the fender slideway or bearings; Fig. 5, a sectional elevation showing an alternative method of housing and locking the fender; and Fig. 6 a like view showing a mechanism operative from the platform.

Like letters and figures of reference indicate corresponding parts in the different figures of the drawings.

My invention relates especially to fenders for electrically-propelled street-cars; and it consists in certain novel features, hereinafter fully set forth and claimed, the object being to produce a simple, cheap, and effective device of this character.

The nature and operation of the improvement will be readily understood by all conversant with such matters from the following explanation:

In the drawings, A represents the car-platform; B, the wheels, and C the dasher.

Supported in brackets b, secured to the forward end of the platform, respectively, at opposite sides, there are two outwardly-inclined slotted tubes or slideways d, the inner or higher ends g of said slideways being bolted to the car body or steps, as may be deemed preferable. These slideways run longitudinally of the car.

The fender proper D consists of a frame having a rear bar f running transversely of the car and working in slots of the slideways d. This bar f connects the side bars h of the frame. At the forward end of said frame said side bars are connected by a curved bar i. Said curved bar is faced with a pneumatic shoe j, constructed of inflated rubber tubing of suitable thickness to withstand whatever wear it may be subjected on the pavement, and serve as a cushion for lessening the blow against an obstruction on the track.

The body of the frame comprises latticework k, connecting the rear bar f with the front curved bar i.

A brace-rod m connects said bar centrally, and is provided with a slot or eye p. (Shown in Fig. 3.) Within the slideways d coiled springs q are mounted, said springs acting expansively against the side bars h to throw them outward and cushioning the fender when projected.

In front of the wheels B, on the body of the car, a shaft r is journaled, one end being squared to receive a crank-handle t. A chain v connects the frame-bar f with said shaft. By rotating the shaft and winding the chain thereon the fender-frame D may be drawn inward in its slideways.

On the dasher C a rod w is fitted to slide vertically, the lower end thereof being reduced at x to enter the socket or opening p in the fender-frame, locking said fender when housed, as shown in Fig. 1.

A bell-crank lever y is pivoted to the dasher C, and one arm thereof is pivoted to the upper end of the rod w, whereby said rod may be manipulated. The opposite arm of the lever forms a handle projecting above the dasher in convenient position for the motorman to actuate the same.

The shaft r is journaled with sufficient friction to prevent the vibration of the car from rotating it and slacking the chain v, so that it would engage the roadway, but not enough to resist the springs q to any appreciable degree.

In the use of my improvement, the fender being housed, as in Fig. 1, when it is desired to drop the same, the motorman throws the handle of the bell-crank lever y from left to right, as viewed in Fig. 3, freeing the same from the rod w. The springs q in the slideways at once force the fender outward to the ends of said ways, the pneumatic shoe or facing j coming into contact with the pavement or so close thereto as to pass under and take up any obstruction on the track which is directed thereby onto the lattice of the fender. Said springs also act to cushion the blow against such object, preventing the injury to persons which would naturally result from a blow with the fender rigid.

By inclining the fender vertically, as described, many objections to the use of horizontal fenders are obviated, as it is practically impossible for small children to be caught under the same and injured.

I do not confine myself to employing the coiled springs $q$ in the slideways for cushioning the fender-frame, as any form of spring, either attached to said ways or to the car-body, may be used; nor do I confine myself to the particular means shown for locking the frame when housed, as any suitable device which can be operated by the foot or hand of the motorman may be employed.

The fender may be also housed without the use of the shaft and chain; but I deem this preferable, as it is necessary to have the springs cushioning the fender of such power that it would require too great exertion to force the same against said springs without the use of such means.

In Fig. 5 I show another method of housing and locking the fender. The shaft $r$ bears a ratchet 15. A chain 16, connecting with the frame-bar $f$, winds on said shaft. The shaft is rotated to house the fender as in the first form. To lock it and release the same from the platform I use the following mechanism: A lug 21 on the car carries a sliding rod 22, which engages the ratchet and holds it against rotation when the fender is housed. A pull-spring 17 connects said lug and a projection on the rod, said spring holding the rod, which acts as a locking-pawl engaged with the ratchet. A pulley 19 is journaled in a hanger on the platform. A chain 18 connects the rod 22 with said pulley. A foot-spindle 20 is fitted to slide vertically in the platform and is attached to the chain 18. By depressing the spindle the pawl may be released from the ratchet, freeing the fender to be projected by its springs.

Figure 6:
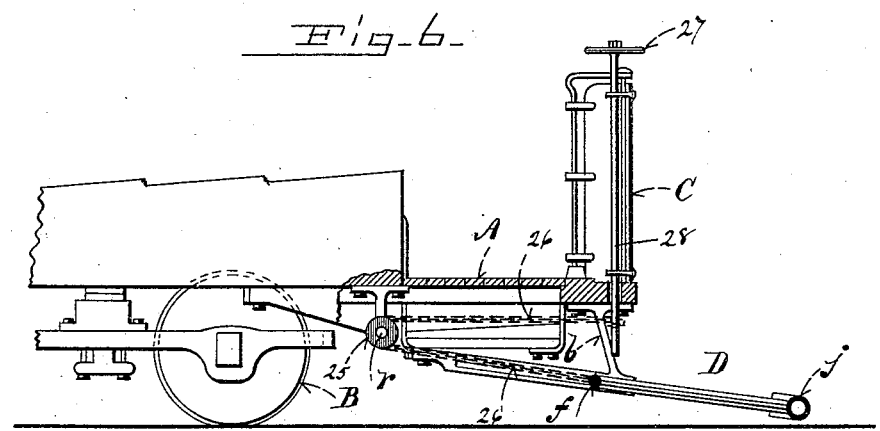

In Fig. 6 a chain 26, connecting with the fender-frame, passes over a pulley 25 on the shaft $r$ and to a staff 28 on the dasher, provided with a hand-wheel 27, which when rotated will wind the chain and house the fender. Any suitable catch may be employed for locking the fender.

Having thus explained my invention, what I claim is—

1. A car-fender comprising a rigid spring-pushed horizontally inclined frame adapted to be moved longitudinally of the car and housed under the platform.

2. A car-fender comprising a sliding frame supported from the platform and horizontally inclined downward; locking mechanism for said frame; and a spring for projecting the frame beyond the dasher.

3. A car-fender comprising a spring-pushed horizontally inclined frame fitted to slide in ways supported from the car and project beyond the platform thereof; mechanism for locking said frame against said spring when housed and a pneumatic shoe or cushion on the outer end of said frame, substantially as described.

4. In a car-fender a horizontally inclined sliding frame supported from the car platform; push-spring for projecting said frame; mechanism for housing said frame against the force of the spring, and a device for locking the frame when housed combined and arranged substantially as described.

5. In a car-fender the combination of the horizontally inclined spring-pushed frame fitted to slide under the car-platform; the sliding locking-rod engaging said frame and operative from said platform.

6. In a car-fender the ways supported from the car-platform in combination with the fender-frame, D, fitted to slide therein; the pneumatic-shoe, $j$, on the outer end of said frame; the push-springs, $q$, for forcing said frame outward and mechanism for locking said frame when housed in said ways, substantially as described.

7. In a car-fender the inclined ways, $d$, supported from the car-platform in combination with the frame, D, fitted to slide in said ways and provided with the pneumatic shoe, $j$, the push-springs, $q$, for projecting said frame; the shaft, $r$, journaled on the car; a chain or belt connecting said frame and shaft whereby the frame may be housed.

RUFUS O. CLARK.

Witnesses:
CHARLES A. ESTABROOK,
WILLIAM H. COTTING.